United States Patent
Thomas et al.

(10) Patent No.: US 9,444,394 B1
(45) Date of Patent: Sep. 13, 2016

(54) MODULAR DEPLOYABLE STRUCTURE

(75) Inventors: Grant M. Thomas, Albuquerque, NM (US); Thomas W. Murphey, Albuquerque, NM (US)

(73) Assignee: THE UNITED STATES OF AMERICA AS REPRESENTED BY THE SECRETARY OF THE AIR FORCE, Washington, DC (US)

( * ) Notice: Subject to any disclaimer, the term of this patent is extended or adjusted under 35 U.S.C. 154(b) by 641 days.

(21) Appl. No.: 13/554,918

(22) Filed: Jul. 20, 2012

(51) Int. Cl.
*H02S 20/20* (2014.01)
*H02S 20/30* (2014.01)
*H01L 31/042* (2014.01)
*H02S 20/00* (2014.01)
*F24J 2/38* (2014.01)

(52) U.S. Cl.
CPC .............. *H02S 20/00* (2013.01); *H02S 20/20* (2014.12); *H02S 20/30* (2014.12); *F24J 2/38* (2013.01)

(58) Field of Classification Search
CPC ............... H01L 31/022008; H01L 31/02008; H01L 31/042; H01L 31/0424; H01L 31/0422; H01L 31/05; H01L 31/00; E04D 13/18; B64G 1/222; B64G 1/22; E05D 3/122; E05D 15/26; E06B 3/481; E05F 15/51; H01Q 15/161; H02S 20/00; H02S 20/10; H02S 20/20; H02S 20/30
USPC ........ 403/81; 126/622, 623, 704; 244/172.7; 53/173.3, 586.1, 200, 22, 251, 586.2, 53/582.1, 656.1, 65, 726.2; 248/167, 170, 248/436, 173, 176.1, 178.1, 672, 681, 676, 248/378, 163.1; 52/173.3, 586.1, 200, 22, 52/251, 586.2, 582.1, 656.1, 65, 726.2
See application file for complete search history.

(56) References Cited

U.S. PATENT DOCUMENTS

| | | | | |
|---|---|---|---|---|
| 4,030,102 A | * | 6/1977 | Kaplan | H01Q 15/161 136/245 |
| 4,148,163 A | * | 4/1979 | Chenin | B64G 1/222 136/245 |
| 4,155,524 A | * | 5/1979 | Marello | B64G 1/443 136/245 |
| 4,932,807 A | * | 6/1990 | Rhodes | B64G 1/222 403/146 |
| 5,833,176 A | * | 11/1998 | Rubin | B64G 1/443 136/245 |
| 6,336,465 B1 | | 1/2002 | Surrendi et al. | |
| 6,343,442 B1 | * | 2/2002 | Marks | B64G 1/222 244/172.6 |
| 2002/0138947 A1 | * | 10/2002 | Jantschek | E04B 2/7431 16/371 |
| 2007/0145195 A1 | * | 6/2007 | Thomson | B64G 1/222 244/172.6 |
| 2010/0269446 A1 | * | 10/2010 | Merrifield | B64G 1/22 52/646 |
| 2011/0097138 A1 | * | 4/2011 | Eikelenboom | B64G 1/222 403/81 |
| 2012/0012701 A1 | * | 1/2012 | Eriksen et al. | 244/100 R |
| 2012/0244999 A1 | * | 9/2012 | Tauriainen | A63B 21/078 482/104 |

* cited by examiner

*Primary Examiner* — Jonathan Liu
*Assistant Examiner* — Muhammad Ijaz
(74) *Attorney, Agent, or Firm* — James M. Skorich

(57) ABSTRACT

A modular deployable structure that includes at least two panels, one of which is configured to be pivotably attached to a further structure for deployment therefrom and return thereto. Interfaces pivotably interconnect each two panels, and are in the form of a pin clevis joint arrangement. Dogbone links are pivotably attached to the interfaces to effect pivoting of the panels. Linkage members extend adjacent to the panels and are pivotable relative to the dogbone links. The linkage members pivotably interengage one another, for example via gears. A drive mechanism effects pivoting of one of the linkage members to in turn effect synchronized pivoting of all of the linkage members and the panels.

2 Claims, 12 Drawing Sheets

MODULAR DEPLOYABLE STRUCTURE

GOVERNMENT INTEREST

The conditions under which this invention was made are such as to entitle the Government of the United States under paragraph 1(a) of Executive Order 10096, as represented by the Secretary of the Air Force, to the entire right, title and interest therein, including foreign rights.

FIELD OF THE INVENTION

The present invention relates to a modular deployable structure, in particular deployable panels, such as photovoltaic panels for use on spacecraft.

BACKGROUND OF THE INVENTION

Deployable space structures, such as deployable truss structures, using pin clevis joints are known, for example from U.S. Pat. No. 4,932,802, to Rhodes. However, the need exists for a modular deployable structure that allows synchronous deployment and rapid assembly of panels, especially photovoltaic panels.

BRIEF SUMMARY OF THE INVENTION

It is therefore an object of the present invention to provide a modular deployable structure that provides synchronous deployment and rapid assembly of panels.

This object is realized by a modular deployable structure that comprises: at least two panels, one of which is configured to be pivotably attached to a further structure for deployment therefrom and return thereto; respective interfaces for pivotably interconnecting each two panels, wherein each interface is in the form of a pin clevis joint arrangement; a respective dog bone link pivotably attached to each of the interfaces to effect pivoting of the panels; respective linkage members extending adjacent to the panels and pivotable relative to the dogbone links, wherein the linkage members pivotably interengage one another, and wherein that linkage member adjacent that one panel that is pivotably connectable to the further structure is also configured to be pivotably attached to such structure; and drive means for operatively effecting pivoting of one of the linkage members to in turn effect synchronized pivoting of all of the linkage members and the panels.

Thus, applicants modular deployable structure, which can readily utilize existing modular rigid photovoltaic panels, is formed of a plurality of parallelogram linkages that effect a synchronous deployment of the panels via the interfaces that pivotably interconnect the panels, the dogbone links that are pivotably attached to the interfaces, and the linkage members that are connected to the dogbone links.

Applicants' modular deployable structure, while eliminating problematic free play of the joints, can furthermore provide a high deployed rigidity by pre-loading its structure onto stop elements.

BRIEF DESCRIPTION OF THE DRAWINGS

Objects and advantages of the present invention are described in detail in the following description in conjunction with the accompanying schematic drawings, in which.

DETAILED DESCRIPTION OF THE INVENTION

Figure 1:
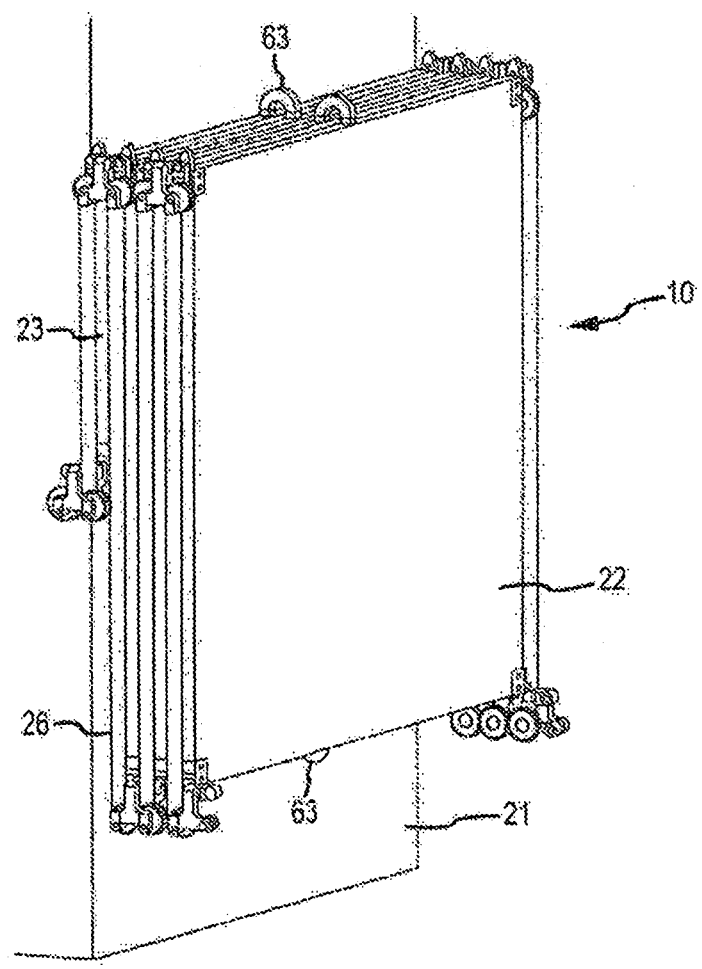
FIG. 1 shows one exemplary embodiment of applicants' modular deployable structure in a stowed state.
Figure 2A:
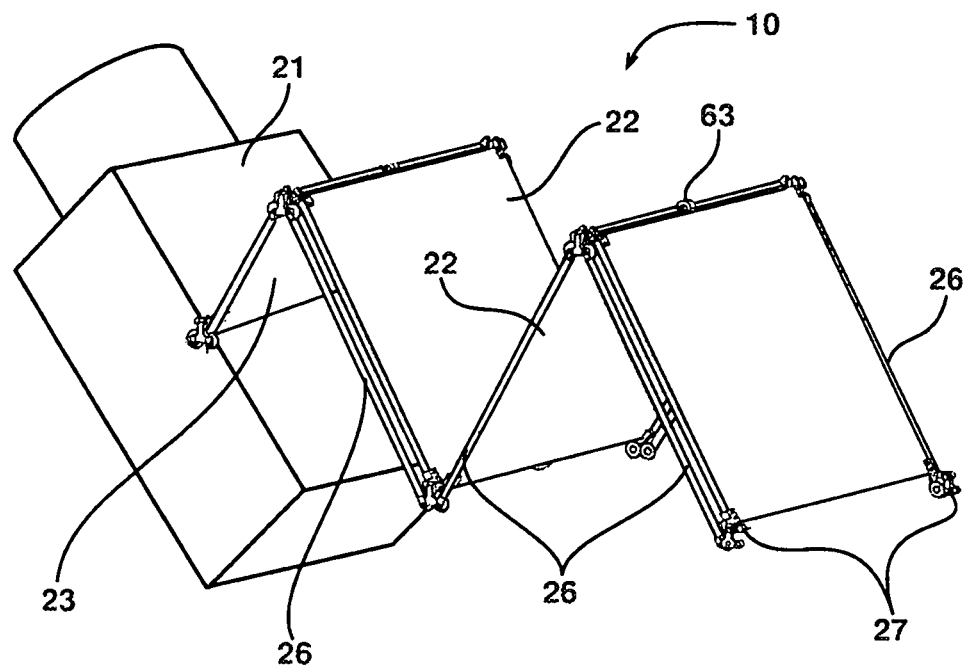
FIG. 2A shows the three-full-panel modular deployable structure of FIG. 1 in a partially deployed state.
Figure 2B:
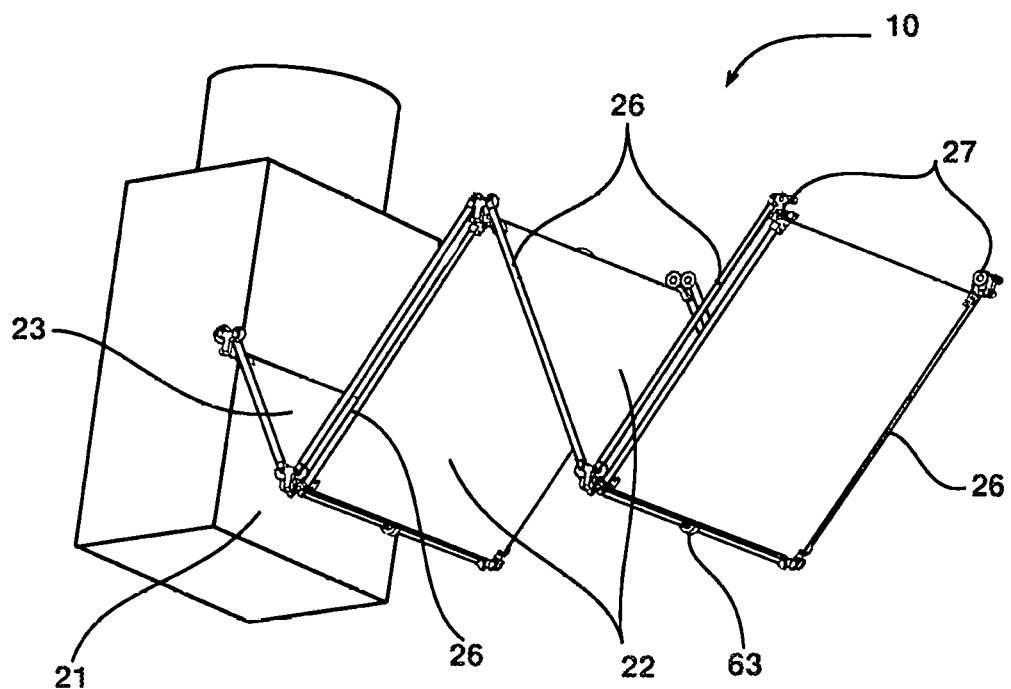
FIG. 2B shows the three-full-panel modular deployable structure of FIG. 1 in a partially deployed state, with the panels rotated in a direction opposite that shown in FIG. 2A.
Figure 3:
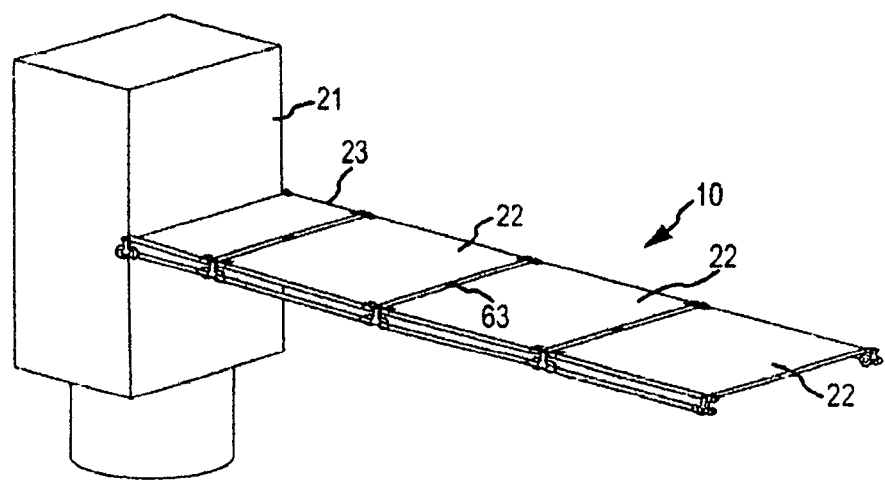
FIG. 3 shows the three-full-panel modular deployable structure of FIG. 1 in a fully deployed state.

While the various features of this invention are hereinafter illustrated and described as providing a modular deployable structure for a particular application, for example for satellites and other spacecraft, it is to be understood that the various features of this invention can be utilized singly or in various combinations thereof to provide a modular structure for other systems that utilize deployable panels or the like.

Therefore, this invention is not to be limited to only the embodiments illustrated in the drawings, because the drawings are merely utilized to illustrate one of the wide variety of usages of this invention.

Referring now to the drawings in detail, applicants' modular deployable structure, or array, which is designated generally by the reference numeral 10, is shown in various stages of being folded together and deployed in FIGS. 1-4, whereas FIGS. 5-11 show details of the structure and operation of the various pivotable connections for the panels of the deployable structure.

Figure 4:
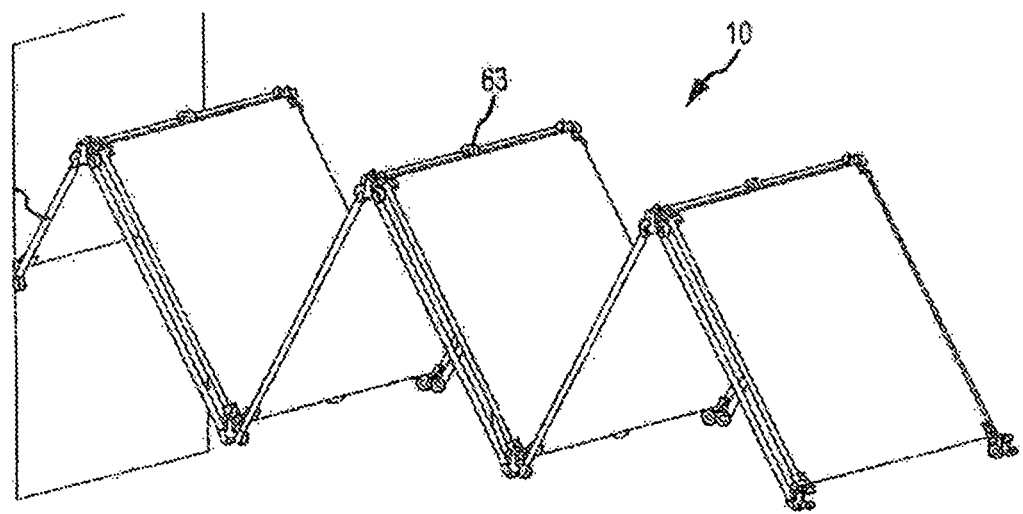
FIG. 4 shows a five-full-panel modular deployable structure in a partially deployed state.

FIG. 1 shows a three-full-panel embodiment of the modular deployable structure 10 of the present application in a folded-together or stowed state, and mounted on a structure 21, such as, by way of example only, a spacecraft bus. In particular, the three-full-panels 22 are pivotably interconnected, as will be discussed in greater detail subsequently, while the full panel 22 located the closest to the structure 21 is pivotably connected to a further half panel 23, which in turn is pivotably connected to the structure 21 (see also the partially deployed view of FIG. 2, and the fully deployed view of FIG. 3). In place of the further half panel 23, a full panel or merely linkage members could be utilized. A further exemplary embodiment of the modular deployable structure 10 of the present application, in this case a five-full-panel version, is shown in FIG. 4. It is to be understood that the actual number of panels is not critical to the present invention, but only their interconnections and deployable construction.

To explain how the panels 22 are interconnected, and also are connected to the structure 21, as well as how the modular deployable structure 10 operates for synchronized deployment and folding together of the panels 22 and 23, reference will now be made to FIGS. 5 and 11, which show the interfaces that pivotably interconnect each two panels 22, and which are designated generally by the reference numeral 25. Also shown are the dogbone links that, via the interaction of linkage members 26, effect pivoting of the panels 22; the dogbone links are designated generally by the reference numeral 27.

Figure 5:
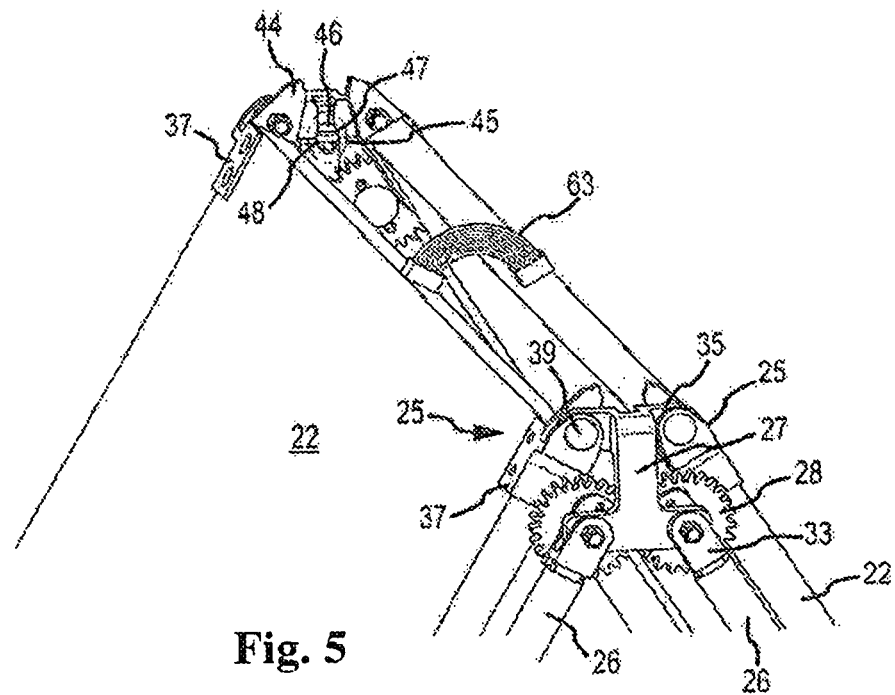
FIG. 5 is a detailed view of one exemplary embodiment of the pivoting mechanisms for the panels, which here are partially deployed.
Figure 6:
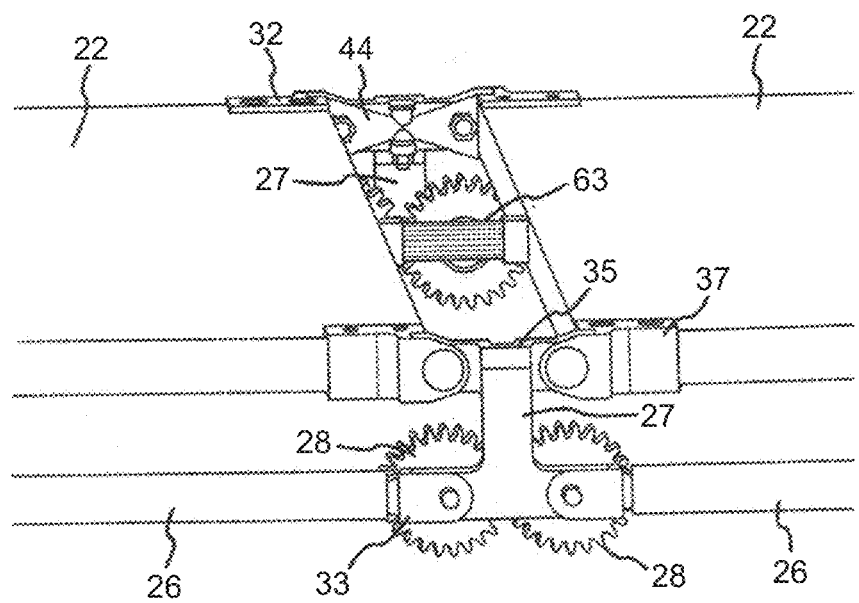
FIG. 6 is a view comparable to that of FIG. 5 with the panels fully deployed.
Figure 7:
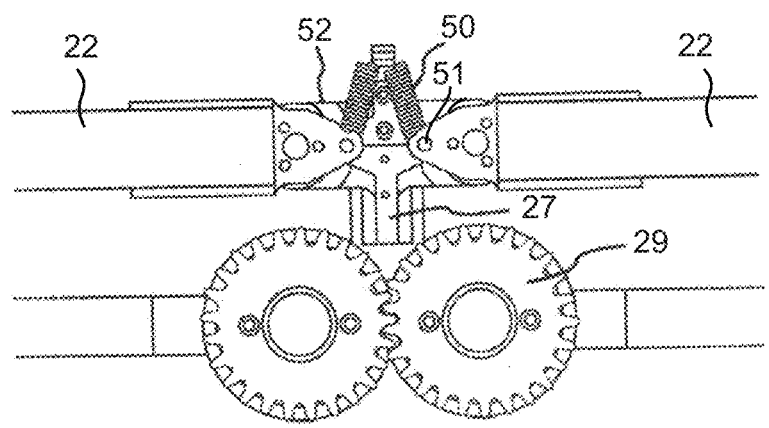
FIG. 7 is a side view of another exemplary embodiment of a pivoting mechanism for the panels, which are here fully deployed.

As can be seen in particular in FIGS. 5, 6, 9A, 9B and 9C, the dogbone link 27 not only pivotably interconnects each two linkage members 26, but is also pivotably connected to the interfaces 25 that interconnect each two panels 22 in such a way that pivoting of the linkage members 26 simultaneously effects pivoting of the panels. At each dogbone link 27, the two linkage members 26 interengage one another. In the illustrated embodiments, this interengagement is effected by a pair of gears, one fixedly secured to each linkage member 26. In the embodiment of FIGS. 5 and 6, the gears are in the form of spur gears 28, whereas in the embodiment of FIGS. 7-10, the gears are in the form of helical gears 29. One gear 28, 29 of the modular deployable structure 10 is caused to rotate by a drive means 30 (FIG. 11), as will be discussed in greater detail subsequently. One exemplary embodiment for the pivotable interconnection of two linkage members 26 by a dogbone link 27 can be best seen in FIGS. 9A, 9B and 9C. Here, each of the two tangs 32 of the dogbone link 27 is pivotably held between two hackles 33 of each linkage member 26.

As can further be seen in FIGS. 5, 6, 9A, 9B and 9C, at that end of the dogbone link 27 that is opposite the tangs 32 thereof, which are pivotably connected to the linkage members 26, a further set of tangs 35 is provided, each of which is pivotably connected to one of the interfaces 25 such that displacement of the dogbone link 27 carries along, and hence pivots, the panels 22 associated with the interfaces 25. With its two sets of tangs 32 and 35, the dogbone link 27 has an approximately H-shaped profile. A similar construction is provided for the half panel 23 at its end remote from its pivotable connection to a panel 22. Here, the structure 21 takes the place of a further linkage member.

Figure 9A:
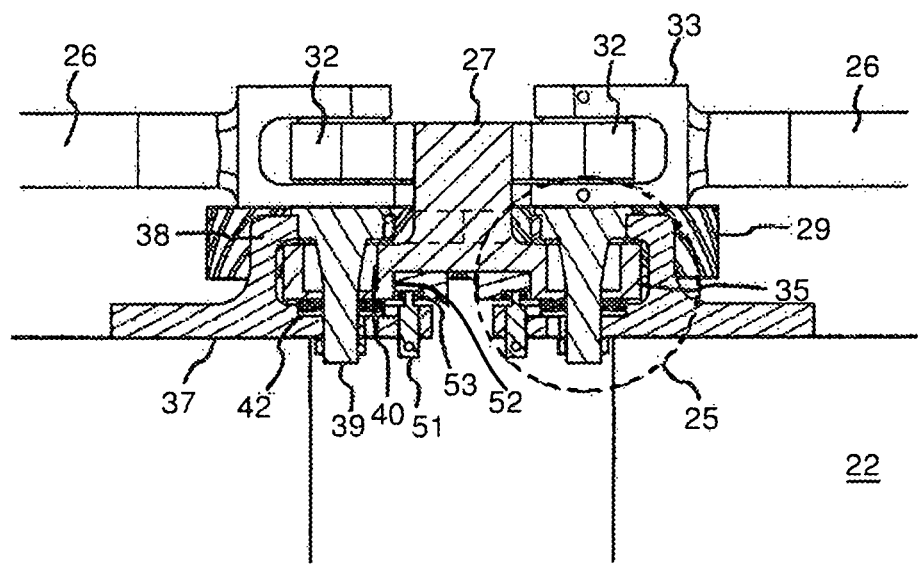
FIG. 9A is a partially cross-sectioned plan view of one exemplary embodiment of a pivoting mechanism of applicants' modular deployable structure.
Figure 9B:
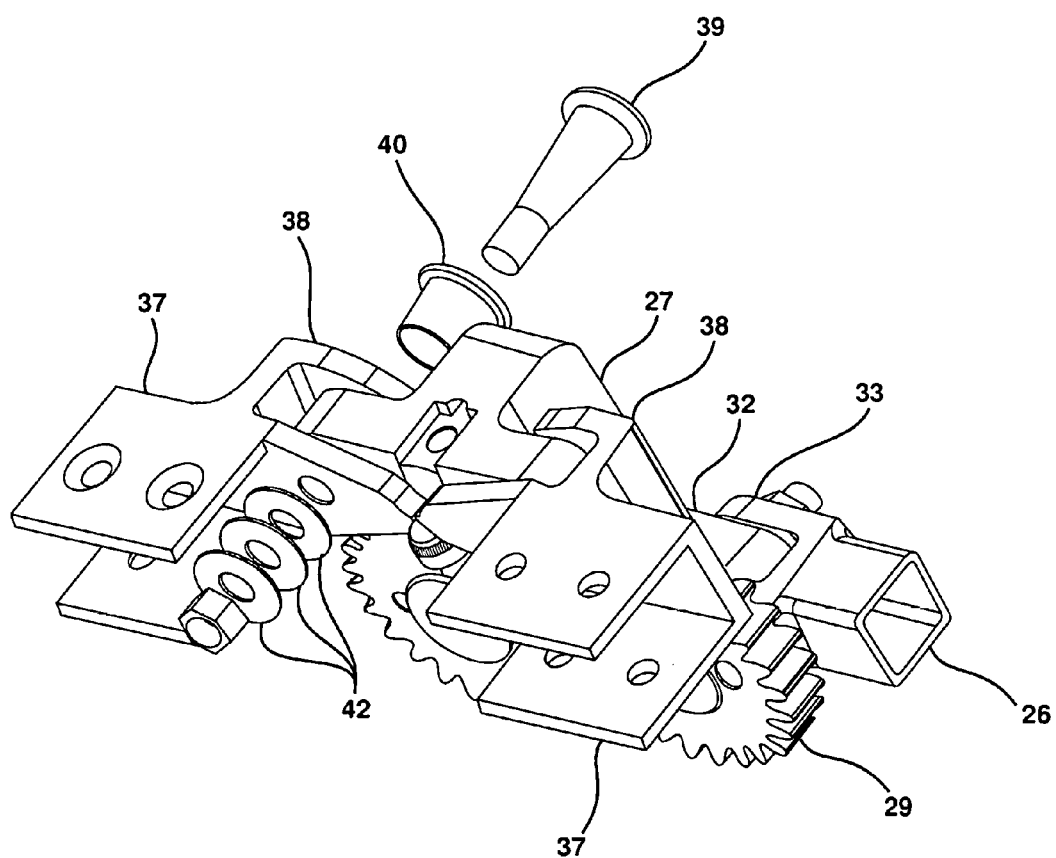
FIGS. 9B and 9C are exploded perspective views of the embodiment of the pivoting mechanism shown in FIG. 9A.
Figure 9C:
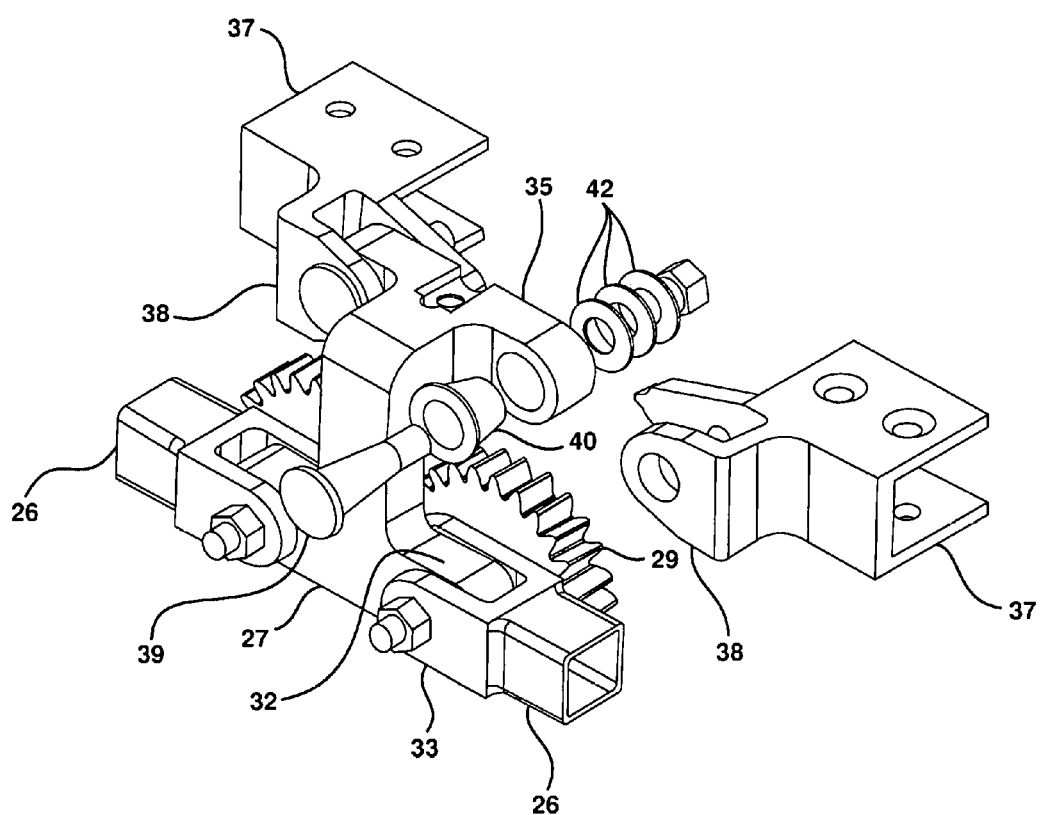

As mentioned previously, each of the interfaces 25 is in the form of a pin clevis joint; this configuration can be best seen in FIGS. 9A, 9B and 9C, which show how the tangs 35 of the dogbone link 27 are pivotably connected to the panels 22 by the interfaces or pin clevis joints 25. In the illustrated embodiment, each of the pin clevis joints 25 includes a shackle portion 37 that is appropriately secured to a panel 22. One leg 38 of the shackle portion 37 holds the head of a tapered pin 39, the tapered shaft portion of which extends through a tapered bushing 40 that is held in a bore of the tang 35. The end of the tapered pin 39 that is opposite the head thereof can be secured in the shackle portion 37 in any suitable manner, for example by a nut. The pin clevis joint 25 is pre-loaded by a single, or stack of Belleville washers 42, or by any other appropriate spring element, to provide a joint that has zero play. This spring arrangement also provides compensation for thermal expansion and wear.

FIGS. 5 and 6 show an exemplary stop mechanism for limiting the pivoting movement of the modular deployable structure 10, and in particular of the panels 22, 23 thereof, comprising deployment stop posts 44 that are secured to the shackle portions 37 of the pin clevis joints 25, as well as a deployment stop spring assembly 45. This spring assembly 45 in turn comprises a stop pin 46, a single, or stack of, Belleville washers 47 (or any other appropriate spring element), and a stop assembly bracket 48, which is attached to the dog bone link 27 and carries the stop pin 46 and Belleville washers 47. As deployment of the modular deployable structure 10 proceeds, the stop posts 44, which rotate together with the panels 22 to which they are secured, are configured to engage the stop pin 46 of the stop spring assembly 45 in the fully deployed position shown in FIG. 6. By providing stiff stop springs, for example the Belleville washers 47, rather than rigid stops, full deployment of the modular deployable structure 10 at each hinge joint is ensured.

The exemplary embodiment illustrated in FIGS. 7, 8, 10 and 12-14 shows an alternative hinge stop design. Here, full deployment is ensured by tension spring elements 50 that pre-load the modular deployable structure 10 in the deployed position. With this embodiment, the deployment stop posts 51 do not extend to the center line of the dogbone link 27, but rather engage recesses 52 provided in the dogbone link (see, for example, FIG. 7). As shown in FIG. 9A, microbeanngs 53 that are connected to stop posts 51 ride along the recesses 52 until stop posts 51 respectively engage two recesses in deployment stop 56 that is attached to the dogbone link 27, for example via screws 57. Again, deployment synchronization is ensured via the spur gears 28 or helical gears 29. The gears are attached to the shackles 33 of the linkage members 26, for example via screws 34 (FIG. 8), and connect the dogbone link 27 to the panels 22 via the tapered pin-clevis construction discussed above.

Figure 11:
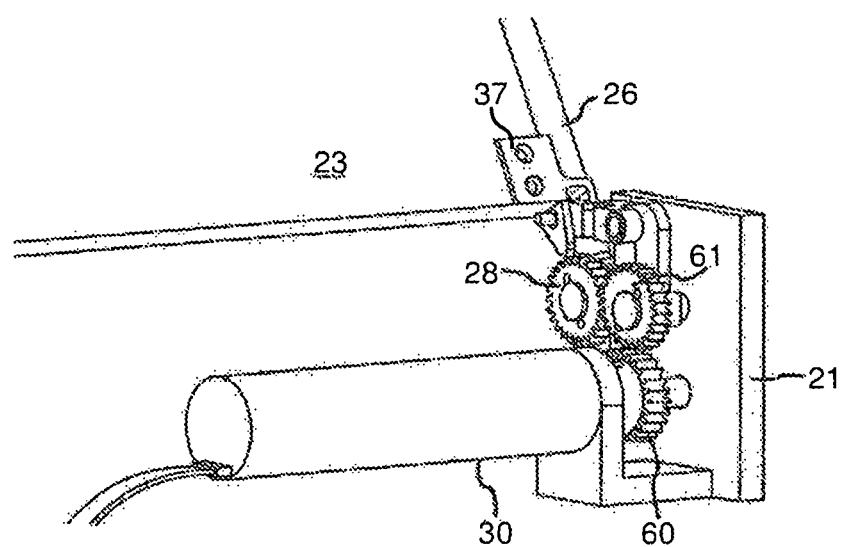
FIG. 11 shows one exemplary embodiment of a drive means for effecting pivoting of the panels.

As mentioned previously, rotation of the gears 28 or 29, for deployment or folding together of the modular deployable structure 10, is effected by the drive means 30, which in the embodiment illustrated in FIG. 11 is in the form of a stepper or infinitely variable motor 30 that is mounted to the structure 21. When the motor 30 is activated, its drive shaft, to which is attached the spur gear 60 or similar engagement means, is caused to rotate, which in turn rotates the spur gear 61, which is rotatably mounted on the structure 21. Rotation of the spur gear 61 causes the spur gear 28 to rotate, which, since it is fixedly attached to a linkage member 26, consequently causes such linkage member to rotate and to rotate together with it, via the intervention of the dogbone link 27 and the pin clevis joint 25, the associated panel, in the manner described in detail above. In the illustrated embodiment, the driven panel is the half panel 23 (see FIGS. 1-4). Deployment or folding-in of the panel 23 synchronously deploys or folds in the remaining panels 22. Instead of the motor 30, it would be possible to use, for example, a torsional spring.

The electrical harnessing of the modular deployable structure 10 between the, here solar, panels 22, 23 themselves and the structure 21, or spacecraft bus, to form a service loop, is indicated schematically only by the reference numeral 63 in FIGS. 1-6.

If the modular deployable structure 10 is in the form of solar array structure, panels 22 would be photovoltaic panels.

Figure 8:
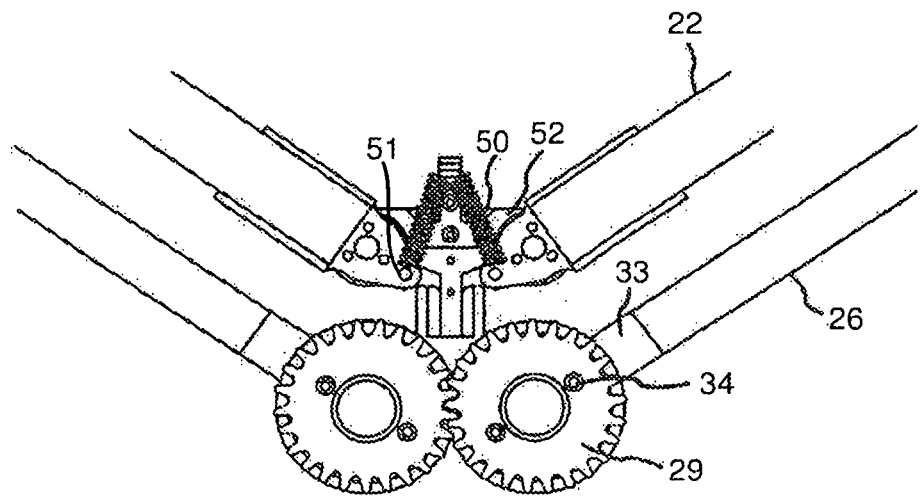
FIG. 8 shows the pivoting mechanism of FIG. 7 with the panels partially collapsed in an upward direction relative to their fully deployed configuration.
Figure 10:
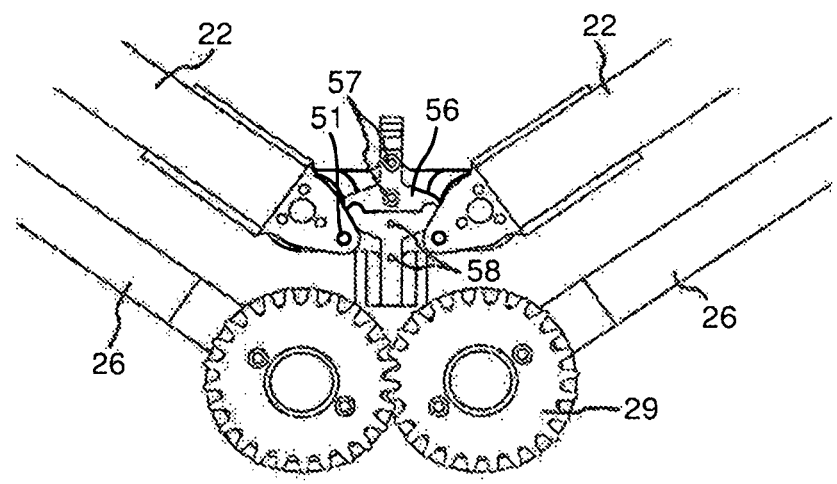
FIG. 10 shows the pivoting mechanism of FIGS. 7 and 8 with the spring elements omitted.
Figure 12:
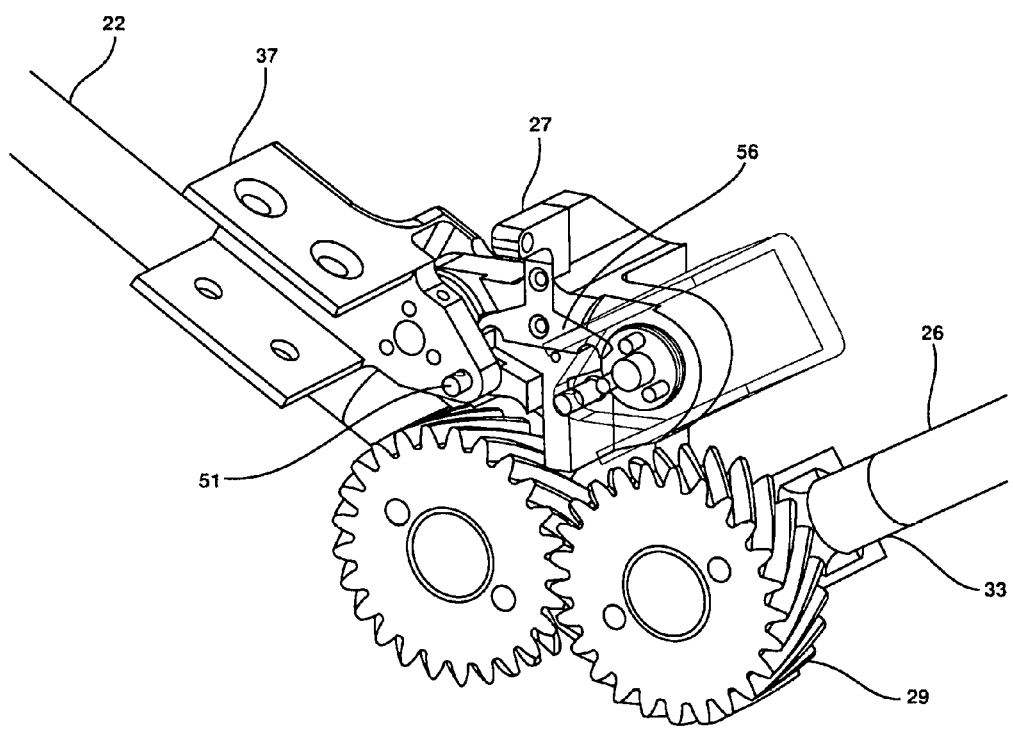
FIG. 12 is a perspective view of the mechanism in the partially collapsed configuration shown in FIG. 8, with the spring elements omitted.
Figure 13:
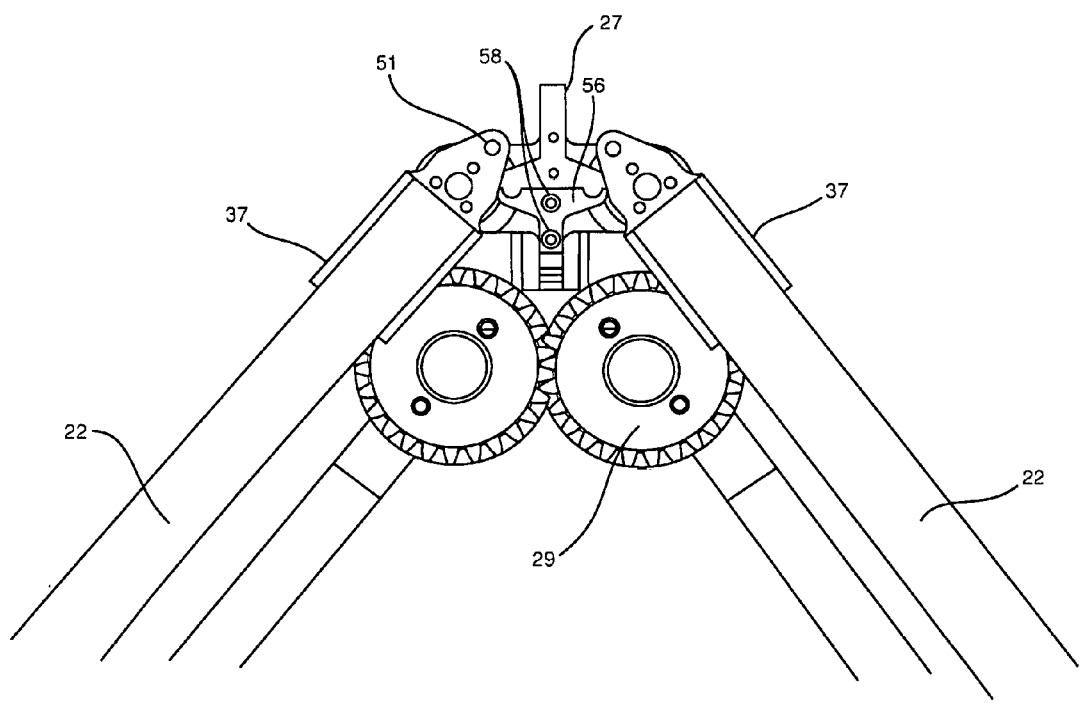
FIG. 13 is a side view of the pivoting mechanism with the spring elements omitted and with the deployment stop reversed from its position in FIGS. 7, 8 and 12, to enable the panels to be collapsed in a downward direction relative to their fully deployed configuration.
Figure 14:
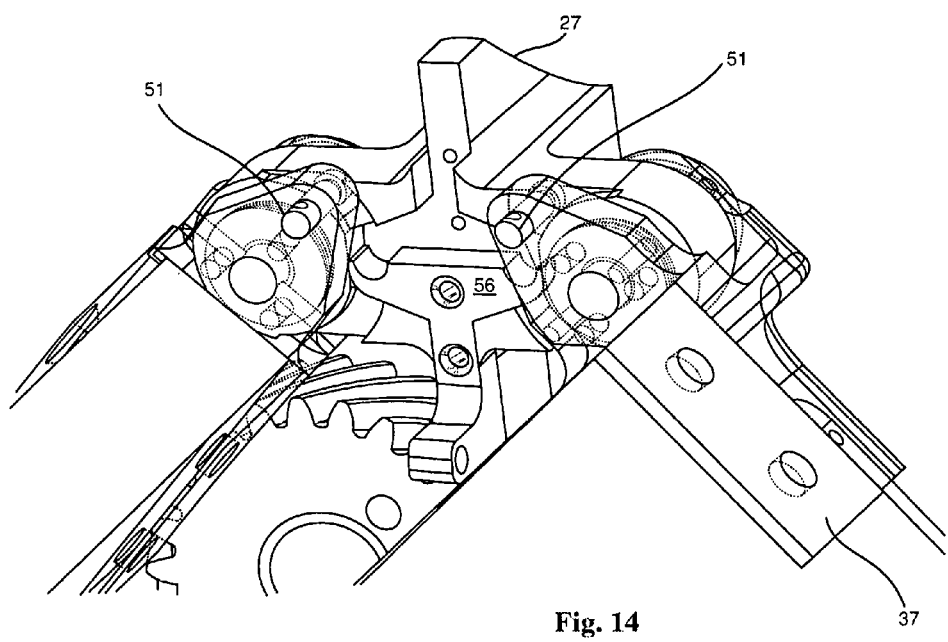
FIG. 14 is a perspective view of the mechanism shown in FIG. 13.

If it is desired to reverse the orientation of the modular deployable structure 10, for example where the panels are solar panels in order to have the appropriate side of the panels facing in the correct orientation, it is merely necessary to remove the deployment stops 56 and the spring elements 50 and reattach them in an upside-down position at the alternate attachment points 58 so that the deployed orientation can be approached from the opposite rotational direction. FIGS. 8, 10 and 12 illustrate stop 56 positioned with the recesses facing downwards, to arrest the rotation of stop post 51 when panels 22 are rotated downward and have reached their deployed, flat configuration. (Springs 50 have been omitted from FIGS. 10 and 12.) FIGS. 13 and 14 show stop 56 rotated 180° from its position in FIGS. 8, 10 and 12 by being attached at points 58, so that the recesses are facing upwards to stop the rotation of stop post 51 when panels are rotated upwards and have reached their deployed configuration. (Springs 50 have been omitted from both of the foregoing figures.) Especially when a half panel 23 is utilized, it is particularly easy to reverse the deployment or stowing direction of the modular deployable structure 10, without requiring disconnection of the entire modular deployable structure 10 from the structure or spacecraft bus 21. In particular, the deployment stop spring assemblies 45 or the deployment stops 56 are removed at every hinge location; they are later reinstalled to the dogbone links 27 in the opposite direction after the modular deployable structure 10, in particular the remaining attached half panel 23, has been stowed in the opposite direction.

Although in the illustrated embodiments two linkage members 26 are shown adjacent each of the panels 22, 23, and hence two associated sets of pin clevis joints 25 and dogbone links 27 are shown, for each panel one linkage member 26, either centrally or toward one side, would be sufficient. However, two or more linkage members 26 are preferred for stability.

Finally, as can be seen in particular in FIGS. 5, 9A, 9B and 9C, the dogbone link tangs 32 are offset relative to the dogbone link tangs 35; this ensures that the modular deployable structure 10 can be stowed compactly against the structure or spacecraft bus 21, as shown in FIG. 1.

The present invention is, of course, in no way restricted to the specific disclosure of the specification and drawings, but also encompasses any modifications within the scope of the appended claims.

What we claim is:

1. A modular deployable structure intended for use with a further structure, comprising:
   at least two panels, one of which is for being pivotably attached to said further structure for deployment therefrom and return thereto;
   a plurality of pin clevis joints;
   a first set of said pin clevis joints for pivotably interconnecting said panels and a second set of said pin clevis joints for pivotably connecting one of said panels to said further structure;
   a plurality of dogbone links comprising a first dogbone link pivotably attached to said first set of pin clevis joints to effect pivoting of said panels
   and a second dogbone link pivotably attached to said second set of pin clevis joints to effect pivoting of said panels;
   each of said pin clevis joints being comprised of a shackle portion secured to one of said panels, and a pin held in said shackle portion and pivotably extending through said dogbone link to pivotably attach said dogbone link to said pin clevis joint;
   each of said dogbone links including a set of two tangs, and each of said pins being pivotably disposed in one of said tangs;
   each of said panels having a first and second linkage members extending adjacent thereto;
   wherein said first and second linkage members adjacent to one panel of the at least two panels respectively interengage said first and second linkage members adjacent of the other panel of the at least two panels, and said first and second linkage members adjacent said one panel which is for being pivotably attached to said further structure are also configured to be pivotably attached to said further structure;
   each of said dogbone links including a stop for being removably attached to said dogbone link in either a first stop position or a second stop position;
   said first stop position for allowing rotation of two of said panels which are pivotably interconnected in a first direction to achieve a deployed configuration, and said second stop position for allowing the rotation of said two interconnected panels in a second direction opposite of the first direction to achieve said deployed configuration;
   drive means for operatively effecting pivoting of one of said linkage members to in turn effect synchronized pivoting of all of said linkage members and said panels;
   a stop post attached to each of said panels, with each of said stop posts pivoting with said panel to which it is respectively attached; and
   said stop includes two recesses for respectively engaging said stop posts for said two interconnected panels when said two interconnected panels are in said deployed configuration.

2. The modular deployable structure according to claim 1 wherein said recesses face in said first facing direction when said stop is in said first stop position and face in said second facing direction when said stop is in said second stop position; and said first and second facing directions are opposite to each other.

* * * * *